No. 672,232. Patented Apr. 16, 1901.
O. LASCHE.
CONSTRUCTION OF ARMATURES AND INDUCTORS FOR DYNAMO ELECTRIC MACHINES OR MOTORS.
(Application filed Feb. 4, 1901.)
(No Model.) 3 Sheets—Sheet 1.
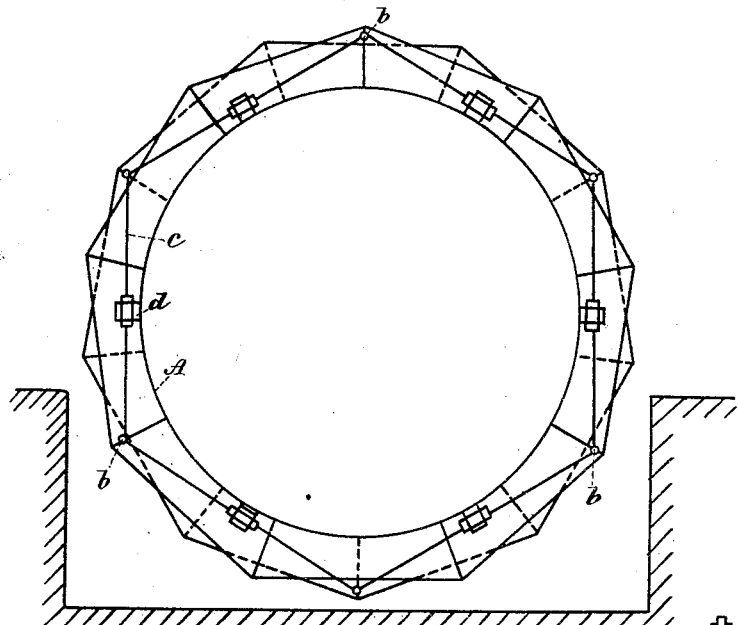
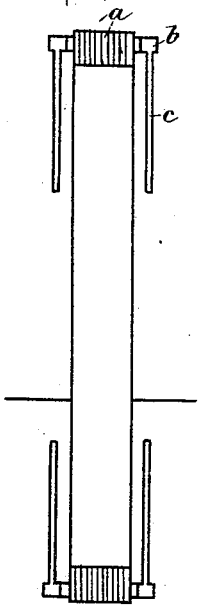
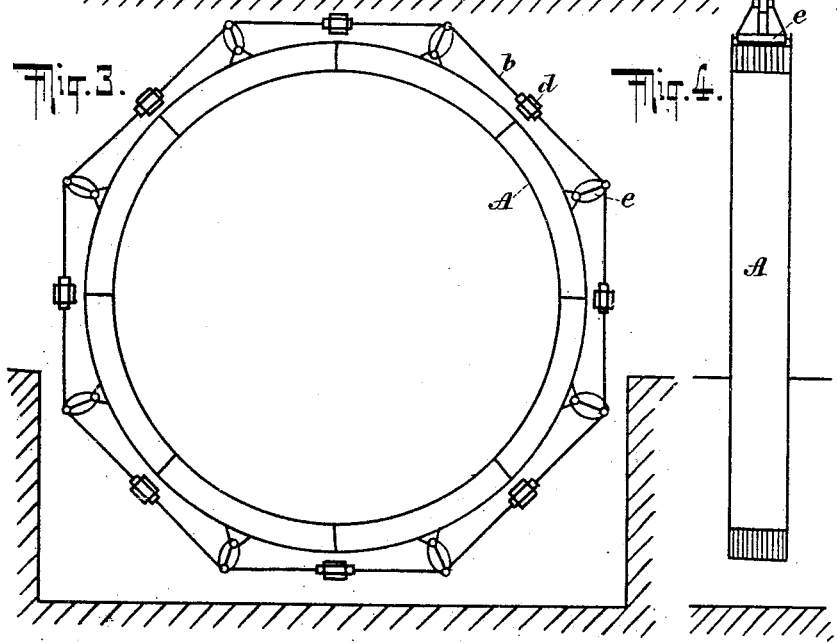
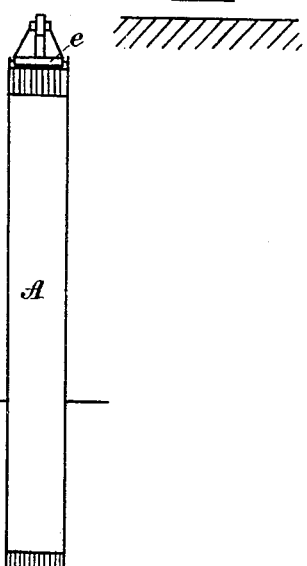
Witnesses:
Inventor
Oskar Lasche
By Briesen & Knauth
Attorneys.

No. 672,232. Patented Apr. 16, 1901.
O. LASCHE.
CONSTRUCTION OF ARMATURES AND INDUCTORS FOR DYNAMO ELECTRIC MACHINES OR MOTORS.
(Application filed Feb. 4, 1901.)
(No Model.) 3 Sheets—Sheet 2.
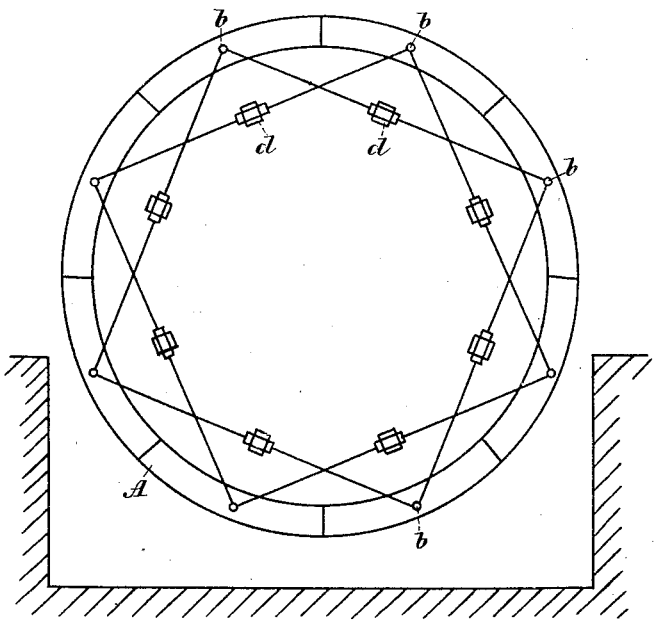
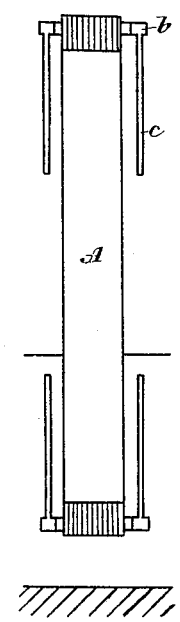
Witnesses:
Inventor
Oskar Lasche
By Briesen & Knauth
Attorneys No. 672,232. Patented Apr. 16, 1901.
O. LASCHE.
CONSTRUCTION OF ARMATURES AND INDUCTORS FOR DYNAMO ELECTRIC MACHINES OR MOTORS.
(Application filed Feb. 4, 1901.)
(No Model.) 3 Sheets—Sheet 3.
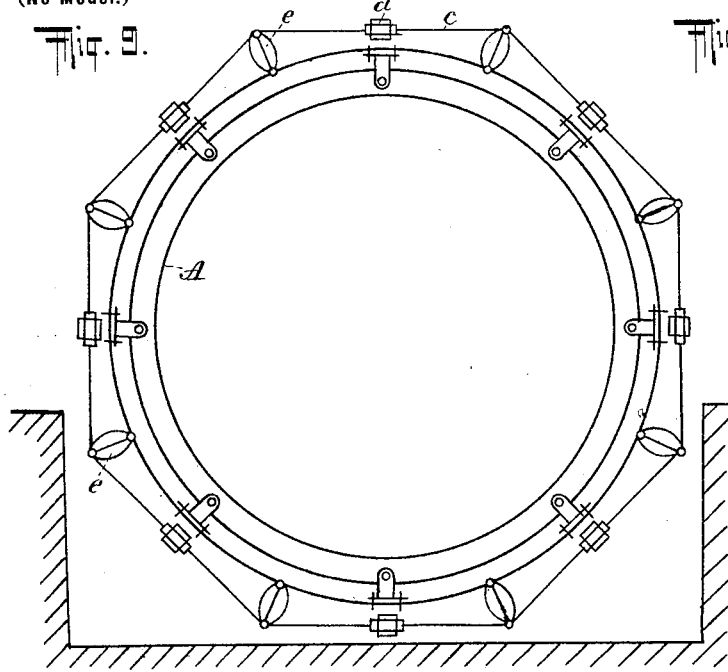
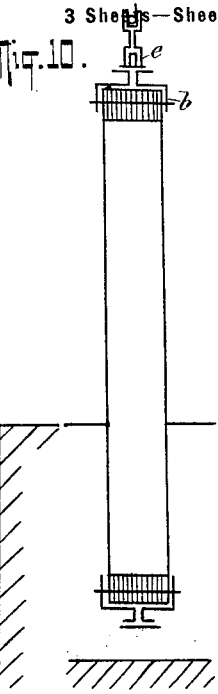
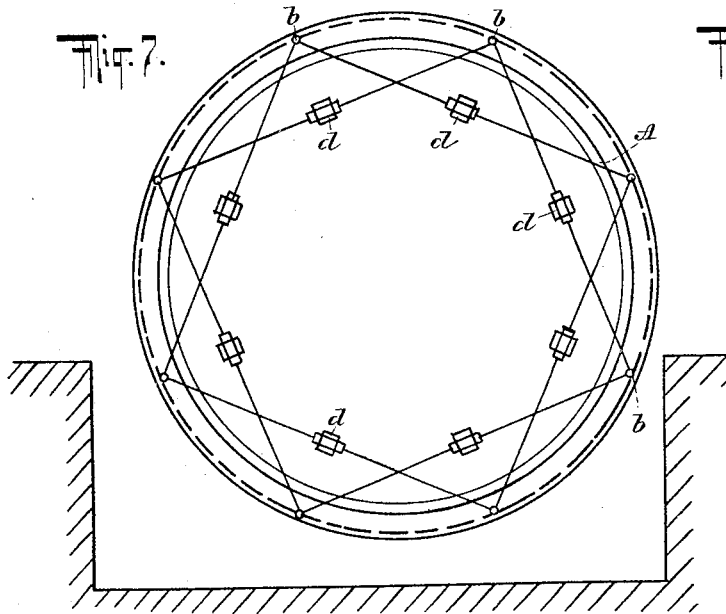
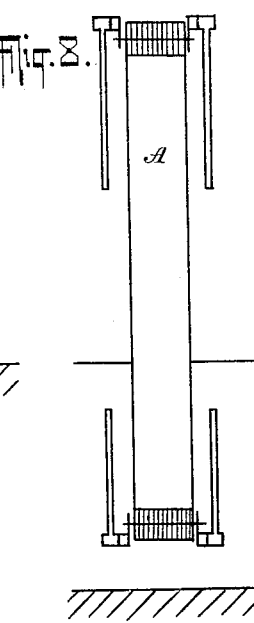
Witnesses:
Inventor
Oskar Lasche
By Briesen & Knauth
Attorneys

UNITED STATES PATENT OFFICE.

OSKAR LASCHE, OF BERLIN, GERMANY.

CONSTRUCTION OF ARMATURES AND INDUCTORS FOR DYNAMO-ELECTRIC MACHINES OR MOTORS.

SPECIFICATION forming part of Letters Patent No. 672,232, dated April 16, 1901.

Application filed February 4, 1901. Serial No. 45,816. (No model.)

*To all whom it may concern:*

Be it known that I, OSKAR LASCHE, engineer, a subject of the German Emperor, residing at Berlin, Kingdom of Prussia, German Empire, have invented certain new and useful Improvements in the Construction of Armatures and Inductors of Dynamo-Electric Machines or Motors, of which the following is a specification.

My invention relates to the construction of armatures and inductors of dynamo-electric machines and motors.

In the accompanying drawings I have shown by way of illustration several constructions embodying my invention. It will be understood, however, that my invention is not limited to these constructions, but that they are merely illustrative.

The object of my invention is to dispense with the cast-iron casings heretofore proposed for the purpose of serving as receptacles for the laminæ or iron plates from which the parts constituting the magnetic circuit of the machine are built up.

The constructive details will be set forth hereinafter, and the essential features of the invention pointed out in the claims.

In the drawings, Figure 1 is a side elevation of a built-up ring embodying my invention. Fig. 2 is a section thereof. Fig. 3 is a side elevation of a modification of my invention. Fig. 4 is a sectional view thereof. Fig. 5 is a side elevation of another modification of my invention. Fig. 6 is a section thereof. Figs. 7 and 8 are side and sectional elevations, respectively, of another modification of my invention; and Figs. 9 and 10 are side and sectional elevations, respectively, of another modification of my invention.

In Fig. 1 the ring A is shown as built up of a number of sections or laminæ $a$. This ring should be given a certain rigidity necessary for the construction by the simplest possible means. The simplest way of achieving this effect is to set up an iron ring alone or by means of auxiliary construction, (centering.) In order to hold the ring together, bolts $b$ are inserted through the laminæ and held together by ties $c$, provided with turnbuckles $d$. By thus constructing the rings the weight of the machine is materially decreased and material saved, and by reason of the consequent possibility of a more intense cooling a higher efficiency may be attained by the machine.

In Figs. 3 and 4 the sections of the metal ring are held together by ties $b$, secured to brackets $e$.

In Figs. 5 and 6 the construction is similar to that of Figs. 1 and 2 with slight modifications.

Figs. 7 and 8 show a construction similar to Figs. 1 and 2 and 5 and 6.

Figs. 9 and 10 show constructions similar to Figs. 3 and 4.

The principle of the invention is capable of great extension, the essential idea being to hold the ring together by tension devices instead of by the iron rings or casings heretofore proposed for that purpose.

Having described my invention, what I claim, and desire to secure by Letters Patent, is—

1. Armatures and inductor-rings for dynamos and motors, comprising a series of sections coupled together by means of tension devices.

2. Armatures and inductor-rings for dynamos and motors, comprising a ring built up of sections coupled together by a tension device surrounding the said ring.

3. In an armature for dynamo machines and motors, the combination of a ring built up of laminæ, means for securing the laminæ to each other and tension devices connecting the laminæ-securing means to each other, substantially as described.

OSKAR LASCHE.

Witnesses:
 WOLDEMAR HAUPT,
 HENRY HASPER.